United States Patent
Asselin

(10) Patent No.: US 11,120,009 B2
(45) Date of Patent: Sep. 14, 2021

(54) METHOD AND A DEVICE FOR DETECTING AN ANOMALY

(71) Applicant: Rockwell Collins France, Blagnac (FR)

(72) Inventor: Eric Asselin, Blagnac (FR)

(73) Assignee: Rockwell Collins France, Blagnac (FR)

( * ) Notice: Subject to any disclaimer, the term of this patent is extended or adjusted under 35 U.S.C. 154(b) by 234 days.

(21) Appl. No.: 16/517,447

(22) Filed: Jul. 19, 2019

(65) Prior Publication Data

US 2020/0026697 A1  Jan. 23, 2020

(30) Foreign Application Priority Data

Jul. 20, 2018  (FR) ...................................... 1856762

(51) Int. Cl.
G06F 16/23  (2019.01)

(52) U.S. Cl.
CPC ................................ *G06F 16/2365* (2019.01)

(58) Field of Classification Search
CPC ..... G06F 16/23; G06F 16/2379; G06F 16/951
USPC ......................................................... 707/690
See application file for complete search history.

(56) References Cited

U.S. PATENT DOCUMENTS

| | | | |
|---|---|---|---|
| 6,477,488 B1 * | 11/2002 | Bellegarda | G10L 15/197 704/9 |
| 8,225,402 B1 | 7/2012 | Averbuch et al. | |
| 10,366,400 B2 * | 7/2019 | Moreau | G06Q 30/0202 |
| 2017/0032439 A1 * | 2/2017 | Paton | G06Q 10/06395 |

(Continued)

OTHER PUBLICATIONS

Wang K et al: "Anomalous Payload-Based Network Intrusion Detection", Recent Advances in Intrusion Detection. 7th International Symposium, Raid 2004. Proceedings—Sep. 15-17, 2004—Sophia Antipolis, France; [Lecture Notes in Comput. Sci. vol. 3224], Springer-Verlag, Berlin, Germany, vol. 3224, Sep. 15, 2004 (Sep. 15, 2004), pp. 203-222.

(Continued)

*Primary Examiner* — James Trujillo
*Assistant Examiner* — Fariborz Khoshnoodi
(74) *Attorney, Agent, or Firm* — Suiter Swantz pc llo

(57) ABSTRACT

This anomaly detection method serves to determine whether a message (MSGEv) that is to be evaluated, that is constituted by symbols and that is to be received by an application, constitutes an anomaly. It comprises:

an extraction step (F10) for extracting N-grams ($NG_k$) from the message that is to be evaluated; a scoring step (F20) of giving a score (SC) to the message (MSGEv) that is to be evaluated from a vector (VPj) and from the N-grams of the message (MSGEv) that is to be evaluated, the vector (VPj) associating each of the N-grams in a set of messages of a training database of a reference class with a value corresponding to a probability of that N-gram occurring in said training database, and a default value for N-grams that do not belong to the messages of the training database; and a comparison step (F30) of comparing the score (SC) of the message (MSGEv) that is to be evaluated with a threshold (THj) of the model in order to decide whether or not the message (MSGEv) that is to be evaluated is an anomaly.

17 Claims, 10 Drawing Sheets

(56) References Cited

U.S. PATENT DOCUMENTS

2018/0121539 A1\* 5/2018 Ciulla ................. G06F 16/3344
2020/0067861 A1\* 2/2020 Leddy ..................... H04L 51/12

OTHER PUBLICATIONS

French Search Report for French Patent Application No. 1856762 dated May 21, 2019. 2 pages.

\* cited by examiner

METHOD AND A DEVICE FOR DETECTING AN ANOMALY

CROSS-REFERENCE TO RELATED PATENT APPLICATIONS

This application claims the benefit of and priority to French Patent Application No. 1856762 filed Jul. 20, 2018, which is hereby incorporated by reference in its entirety.

BACKGROUND OF THE INVENTION

The present invention lies in the general field of detecting intrusion targeting an application capable of receiving messages. The invention applies more particularly to detecting intrusion in applications suitable for processing messages that are relatively predictable.

Specifically, performance of the invention relies on being able to set up a history of messages normally expected by the application.

The invention may be used in particular for detecting intrusion targeting a web service, e.g. as offered by a bank.

The invention may also be used for detecting an intrusion directed at an application on board an aircraft, e.g. complying with the meteorological terminal and report (METAR) standard.

In order to respond to this problem, it is common practice to seek to detect whether a message received by the application presents a signature that is representative of an intrusion. However such a method presents drawbacks. In particular, it relies on possessing a history of attacks and on the ability to update the signature database whenever a new attack is detected.

That second constraint prevents making use of such a solution in applications for which any updating requires a relatively cumbersome certifying process.

The invention thus seeks to provide a method of detecting intrusion that does not present the above-mentioned drawbacks.

It is common for an intrusion into an application to be manifested by a message being sent to the application, which message is of a kind that is not normally expected by the application.

OBJECT AND SUMMARY OF THE INVENTION

In a first aspect, the invention provides a model creation method for creating a model serving to detect whether a message that is to be evaluated, that is constituted by symbols, and that might be received by an application, constitutes an anomaly.

The method comprises:
  an obtaining step for obtaining a set of messages belonging to a reference class specific to the application in order to constitute a training database;
  an identification step for identifying the set of N-grams in the messages of the training database; and
  a generation step for generating a vector of the model, the vector associating:
    each of said N-grams with a value representing the probability of the N-gram occurring in the training database; and
    a default value for giving to the N-grams that do not belong to the messages of the training database;
  a definition step for defining a function for giving a score to a message that is to be evaluated from the values of the vector associated with the N-grams of the message that is to be evaluated, this function being selected so as to discriminate between the scores of anomalies and the scores of normally expected messages by comparing those scores with a defined threshold that is defined for the function;
  the message that is to be evaluated being considered as being an anomaly or not an anomaly as a function of the result of the comparison between the score given to the message and the above-specified threshold.

The anomaly detection method of the invention is remarkable in that it does not require a history of attacks to be available, nor does it require a database of known attack signatures to be created and kept up to date.

In a second aspect, the invention provides an anomaly detection method serving to determine whether a message that is to be evaluated, that is constituted by symbols, and that is to be received by an application, constitutes an anomaly. This method comprises:
  an extraction step for extracting N-grams from the message that is to be evaluated;
  a scoring step of giving the message that is to be evaluated a score determined from a vector and from the N-grams of the message that is to be evaluated, the vector associating each of the N-grams in a set of messages of a training database of a reference class with a value corresponding to a probability of that N-gram occurring in the training database, and a default value for N-grams that do not belong to the messages of the training database, the score being given by a function that is selected to discriminate between the scores of anomalies and the scores of messages normally expected by the application, by comparing the scores with a threshold defined for the function; and
  a comparison step of comparing the score of the message that is to be evaluated with the threshold in order to decide whether or not the message that is to be evaluated is an anomaly.

In accordance with the invention, when an anomaly is detected, it may be registered or an alert may be generated.

In a particular implementation, the threshold is defined:
  from the smallest score given to the messages of the training database, when the above-mentioned function discriminates anomaly scores by giving them low values; or
  From the highest score given to the messages of the training database, when the function discriminates anomaly scores by giving them high values.

In a particular implementation, in order to give the score to the message that is to be evaluated, the scoring function uses a generalized mean of order less than 1 applied to the components of the vector corresponding to the N-grams of the message that is to be evaluated.

The use of such a function and selecting a default value serves advantageously to discriminate strongly between the scores that are obtained for anomalies and the scores that are obtained for normally expected messages.

In an implementation of the invention, the N-grams are digrams.

In an implementation of the invention, at least some of the messages of the reference class are aircraft addressing and reporting system (ACARS) messages or portions of ACARS messages. These ACARS messages may optionally be encapsulated in internet protocol (IP) packets.

In an implementation of the invention, the applications comply with the Aeronautical Radio Incorporated (ARINC) standard.

In an implementation, the model creation method of the invention includes a prior step of capturing messages of the training database.

In a particular implementation, said determination step for determining the default value for the N-grams that do not belong to the messages of the training database comprises:
  a loop during which a current value is caused to vary, the loop comprising:
    a detection step for detecting anomalies among the messages of a test database of the reference class, evaluating whether each of those messages constitutes an anomaly by using the anomaly detection method of the invention after setting the default value equal to the current value in the vector;
    a determination step for determining a false positive rate for the messages of the test database for the current value on the basis of the number of anomalies detected among the messages of the test database;
    a detection step for detecting anomalies among messages unexpected by the application and contained in a database of messages not belonging to the reference class, evaluating whether each of these messages constitutes an anomaly by using the anomaly detection method of the invention after setting the default value equal to the current value in the vector; and
    a determination step for determining a detection rate for each unexpected message on the basis of the number of anomalies detected among these unexpected messages;
  the default value being selected from the above-mentioned false positive rate and detection rate and from a utilization context of the method.

In another particular implementation, the determination step for determining the default value for the N-grams that do not belong to the messages of the training database comprises:
  a first loop during which a current value is caused to vary, this first loop comprising:
    a detection step for detecting anomalies among the messages of a test database of the reference class, evaluating whether each of those messages constitutes an anomaly by using the anomaly detection method of the invention after setting the default value equal to the current value in the vector;
    a determination step for determining a false positive rate for the messages of the test database for the current value on the basis of the number of anomalies detected among these messages;
    a second loop during which a number of mutations is caused to vary, this second loop comprising:
      a generation step for generating messages of the test database and for each of these messages to generate an unexpected message that is obtained by varying the number of mutations of symbols in the N-grams of this message; and
      a determination step for determining a detection rate for the unexpected messages;
    a determination step for determining a minimum number of mutations for obtaining a predefined trusted detection rate; and
    a step during which each current value is associated with a pair comprising the minimum number of mutations and the false positive rate; and
  a selection step for selecting one of these pairs as a function of a utilization context for the method, the default value being selected on the basis of the value associated with said pair.

The invention also provides a model creation device for creating a model serving to detect whether a message that is to be evaluated, that is constituted by symbols, and that might be received by an application, constitutes an anomaly. The device comprises:
  an obtaining module for obtaining a set of messages belonging to a reference class specific to the application in order to constitute a training database;
  an identification module for identifying the set of N-grams in the messages of the training database; and
  a generation module for generating a vector of the model, the vector associating:
    each of said N-grams with a value representing the probability of the N-gram occurring in the training database; and
    a default value for giving to the N-grams that do not belong to the messages of the training database;
  said device further comprising:
  a definition module for defining a function for giving a score to a message that is to be evaluated from the values of the vector associated with the N-grams of the message that is to be evaluated, this function being selected so as to discriminate between the scores of anomalies and the scores of normally expected messages by comparing those scores with a defined threshold that is defined for the function;
  the message that is to be evaluated being considered as being an anomaly or not an anomaly as a function of the result of the comparison between said score given to the message and the threshold.

The invention also provides an anomaly detection device serving to determine whether a message that is to be evaluated, that is constituted by symbols and that is to be received by an application, constitutes an anomaly, the device comprising:
  an extraction module for extracting N-grams from the message that is to be evaluated;
  a scoring module of giving a score to the message that is to be evaluated from a vector and from the N-grams of the message that is to be evaluated, the vector associating each of the N-grams in a set of messages of a training database of a reference class with a probability of that N-gram occurring in the training database, and a default value for N-grams that do not belong to the messages of the training database, the score being given by a function that is selected to discriminate between the scores of anomalies and the scores of messages normally expected by the application, by comparing the scores with a threshold defined for the function; and
  a comparison module of comparing the score of the message that is to be evaluated with the threshold in order to decide whether or not the message that is to be evaluated is an anomaly.

The particular advantages and characteristics of the model creation device and of the anomaly detection device are identical to those of the below-mentioned model creation and anomaly detection methods.

In a particular embodiment, the various steps of the model creation method and/or of the anomaly detection method are determined by computer program instructions.

Consequently, the invention also provides:
a computer program on a data medium, the program being suitable for being performed in a computer, the program including instructions adapted to performing steps of a model creation method as described above; and
a computer program on a data medium, the program being suitable for being performed in a computer, the program including instructions adapted to performing steps of an anomaly detection method as described above.

These programs may use any programming language and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), or indeed magnetic recording means, e.g. a hard disk.

Furthermore, the data medium may be a transmissible medium such as an electrical or optical signal, suitable for being conveyed via an electrical or optical cable, by radio, or by other means.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show implementations having no limiting character. In the figures:

FIGS. 8-1 to 8-9 show variation in a detection rate as a function of a number of mutations;

FIG. 9 shows correlation between a number of mutations and a false positive rate;

DETAILED DESCRIPTION OF A FIRST IMPLEMENTATION OF THE INVENTION

Figure 1:
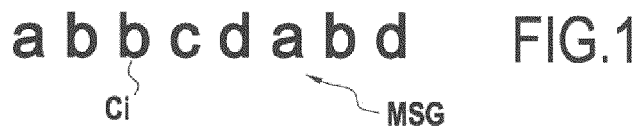
FIG. 1 shows an example message.

FIG. 1 shows a message MSG made up of symbols $C_i$, specifically in this example the symbols "a", "b", "c", "d", "a", "b", and "d". These symbols form part of an alphabet made up of a set of symbols that can be understood in a message.

It should be recalled that an n-gram of a message MSG is a sequence of symbols of length n extracted from the message MSG. In this example the symbols are characters.

By way of example, digrams (i.e. n-grams of length 2) in this message are thus the following symbol sequences "ab", "bb", "bc", "cd", "da", "ab", and "bd".

In the description below, consideration is given to digrams, however the invention may be performed using n-grams of other lengths n.

Figure 2:
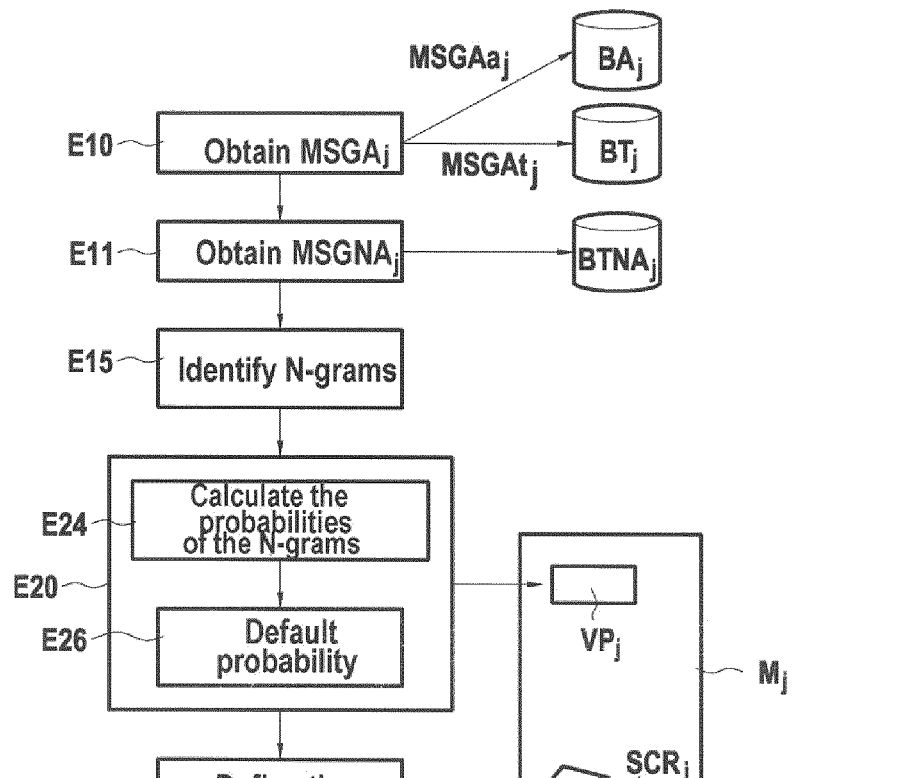
FIG. 2 is in the form of a flow chart showing the main steps of a model creation method in accordance with an implementation of the invention.

FIG. 2 is in the form of a flow chart showing the main steps of a method of creating a model $M_j$ suitable for detecting whether a message that is to be evaluated, that is constituted by symbols $C_i$, and that might be received by an application $AP_j$, e.g. an application in a modern aircraft, constitutes an anomaly.

In accordance with the invention, it is assumed that there is available a set of messages $MSGA_j$ that are considered as being normally expected by the application $AP_j$. In a first variant, described below with reference to FIGS. 5 and 6, there is also available a set of messages that are unexpected. In a second variant, described below with reference to FIGS. 7 to 9, only normally expected messages are available.

The messages $MSGA_j$ that are considered as being normally expected by the application $AP_j$ may have been captured beforehand and may constitute all or part of a history of the messages received by the application $AP_j$. They might possibly include messages that are, in fact, unexpected by the application $AP_j$, but that have not been identified as such.

The messages $MSGA_j$ that are considered as normally expected by the application $AP_j$ may be said to belong to a common reference class $CR_j$ specific to the application $AP_j$.

In accordance with the invention, the method of creating the model $M_j$ includes a step E10 of obtaining a set of messages $MSGA_j$ that are considered to be normally expected.

More precisely, the set of messages $MSGA_j$ that are considered as being normally expected by the application $AP_j$ is subdivided into two subsets, namely a training database $BA_j$ comprising messages referred to below as $MSGAa_j$ and a test database $BT_j$ comprising messages referred to below as $MSGAt_j$.

In a particular implementation, the method includes a step E11 that serves to obtain a second set of messages $MSGNA_j$ that do not belong to the reference class $CR_j$ specific to the application $AP_j$ in order to constitute a test database of unexpected messages $BTNA_j$ comprising the messages $MSGNA_j$.

In accordance with the invention, the method of creating a model $M_j$ includes a step E15 of identifying K digrams $NG_{k,j}$ in the messages $MSGAa_j$ of the training database $BA_j$. These digrams are written $NG_{k,j}$ in which k lies in the range 1 to K. This step consists in considering all of the messages $MSGAa_j$ of the training database $BA_j$ and, for each of those messages, in identifying the set of digrams in the message as in the example described above with reference to FIG. 1.

Returning to the example of FIG. 1, the digrams of the message MSG are {"ab", "bb", "bc", "cd", "da", "ab", "bd"}.

Figure 3:
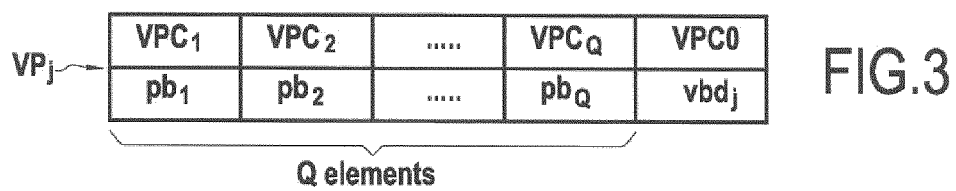
FIG. 3 shows a vector that can be used in an implementation of the invention.

In accordance with the invention, the method of creating a model Mj includes a general step E20 of generating a vector VPj associated with the model, an example of which is shown in FIG. 3.

The vector VPj generated by the invention is a table made up of components VPCq (shown in a first row of the table of FIG. 3) representing the Q distinct digrams NGq,j of the training database BAj.

Each of these components is associated with a component (shown in the second line of the table) of value that represents the probability pbq (as calculated during a step E24) of the corresponding digram NGq,j occurring in the training database BAj.

In the presently-described implementation, the probability pbq of a digram NGq,j occurring in the training database BAj is calculated by dividing i) the number of occurrences of this digram in the database BAj by ii) the total number of digrams in the training database.

In an alternative implementation, the probability pbq may be calculated on a sample of messages or of digrams of the training database.

Still with reference to FIG. 1, assuming that the training database comprises only the message MSG, the training database has seven digrams, the digram "ab" having two occurrences, and each of the other digrams having only one occurrence. Consequently, the probability of occurrence of the digram "ab" is set at 2/7 and the probability of each of the other digrams: "bb", "bc", "cd", "da", and "bd" is set at 1/7.

The vector VPj generated by the invention also associates a default value vbdj (as determined during a step E26) for the digrams that do not form part of the training database BAj.

In the presently-described implementation, the same default value is associated with all of the digrams that do not belong to the training database BAj.

Still with reference to FIG. 1, this default value vbdj is thus given in particular to each of the digrams "ba", "cc", "dc", "ae", and "ef", etc.

Thus, in this implementation, and as shown in FIG. 3, the vector VPj comprises, in column Q+1, a component VPC0 representing the digrams absent from the training database BAj, this component being associated with a component representing the default value vbdj, which is set to 1/21 in this example.

Two techniques in accordance with the invention for setting the default value vbdj are described below with reference to FIGS. 5 to 9.

In accordance with the invention, the method of creating a model Mj includes a step E30 of defining a function SCRj serving to give a score SC to a message MSGEv for evaluation on the basis of the values of the vector VPj (components of the second row of the table of FIG. 3) associated with the digrams of said message for evaluation MSGEv.

This scoring function SCRj is selected to make it possible to discriminate between the scores of anomalies and the scores of messages normally expected by the application APj, with this discrimination being performed by comparing the scores with a threshold THj defined for the function.

In the description below, it is considered that the anomalies are messages for which the scores given by the function are less than the threshold. However, in a variant, it could be considered that the anomalies are messages for which the scores given by the function are greater than the threshold.

By way of example, the function SCRj may be the harmonic mean of the values associated in the vector VP with the digrams of the message MSGEv that is to be evaluated. It should be recalled that the harmonic mean H of a set of M strictly positive terms $x_1, \ldots x_M$ is given by:

$$H = M(1/x_1 + \ldots + 1/x_M)$$

By way of example, if the function SCRj is applied to the following values:

| Set of values | | | | | | | | |
|---|---|---|---|---|---|---|---|---|
| 8 | 9 | 9 | 10 | 10 | 10 | 11 | 11 | 12 | the harmonic mean gives the values 1 to 9 of the table a result that is close to 9.9. It should be observed that this value is close to the conventional mean (i.e. the "arithmetic" mean), which is 10.

If the function SCRj is now applied to the above set of values, but to which the value 16 is added, i.e. a value that is about six points greater than the above means, it can be seen that the arithmetic mean gives 10.6, i.e. a change of 0.6; likewise for the harmonic mean, a value close to 10.3 is obtained, i.e. a change of about 0.4. This difference shows the sensitivity of the harmonic function for a set of given values.

If, instead of adding a value that is about six points above the above means, a value is added that is about six points below them, i.e. by way of example the value 4, and if the function SCRj is applied to this new set of values, it can be seen that the arithmetic mean gives 9.4, i.e. an absolute value change of 0.6, identical to the change obtained for a value situated six points above. If the harmonic mean is selected as the function SCRj, then a value is obtained that is close to 8.6, i.e. an absolute change close to 1.3, which is more than three times greater than the difference obtained above. This shows the discriminating behavior of the harmonic mean with respect to low values. Any function having this behavior could be used as the function SCRj, and in particular any generalized mean of negative order.

Other scoring functions may be considered, and in particular:

the function:

$$(x_1, \ldots, x_M) \to (\ln(avg/x_1) + \ldots + \ln(avg/x_M))/M \text{ with } avg = (x_1 + \ldots + x_M)/M$$

generalized means of order strictly less than 1:

$$(x_1, \ldots, x_M) \to \exp((\log(x_1) + \ldots + \log(x_M))/M$$

$$(x_1, \ldots, x_M) \to ((x_1^{-2} + \ldots + x_M^{-2})/M)^{-1/2}$$

$$(x_1, \ldots, x_M) \to ((x_1^{-3} + \ldots + x_M^{-3})/M)^{-1/3}$$

By symmetry, it is also possible to use functions that discriminate outlier values situated beyond the mean. All generalized means of order strictly greater than 1 (quadratic, cubic, . . . means) can be used as scoring functions, and in particular:

$$(x_1, \ldots, x_M) \to ((x_1^2 + \ldots + x_M^2)/M)^{1/2}$$

$$(x_1, \ldots, x_M) \to ((x_1^3 + \ldots + x_M^3)/M)^{1/3}$$

Figure 13:
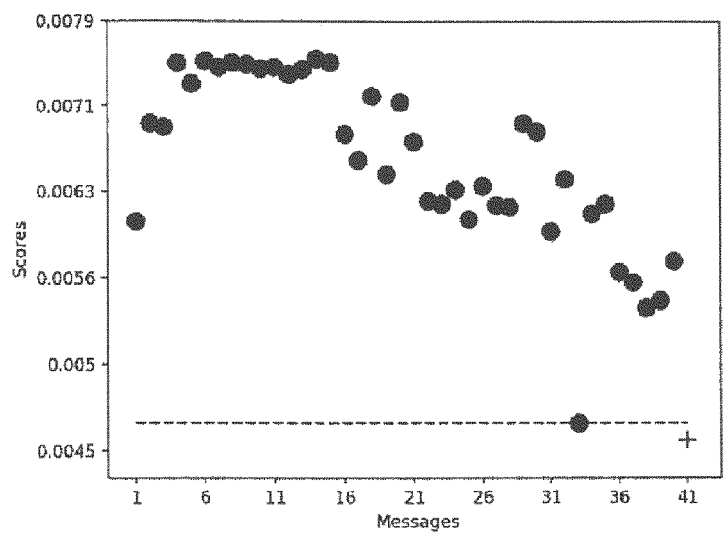
FIGS. 13, 14, and 15 show the sensitivity of three scoring functions.
Figure 14:
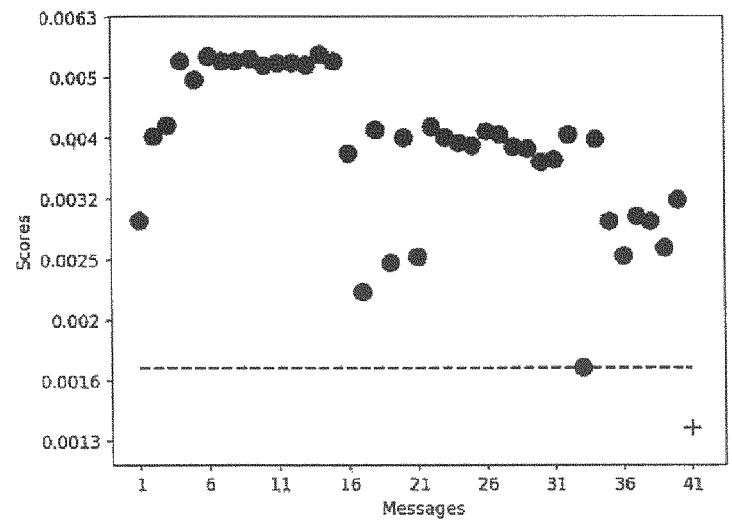
Figure 15:
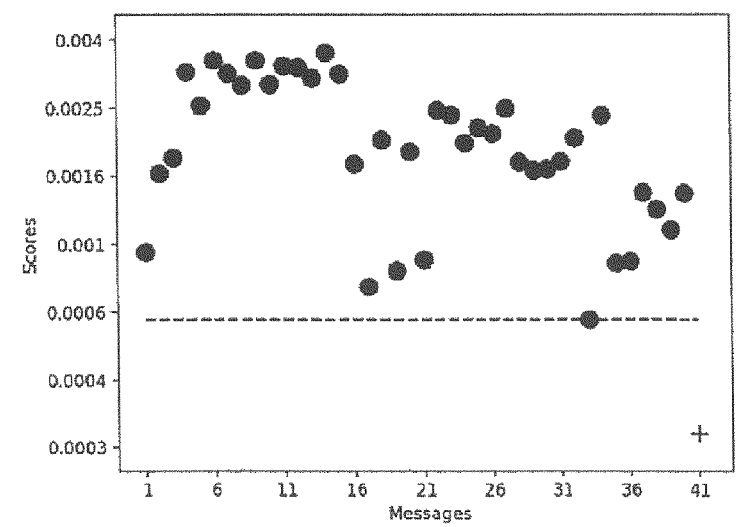

With reference to FIGS. 13, 14, and 15, the Applicant has created a training database BAj of 40 messages and has calculated the score of each of those 40 messages by making use of the following scoring functions respectively: an arithmetic mean (FIG. 13); a geometric mean (FIG. 14); and a harmonic mean (FIG. 15).

In each of these figures, the points represent the scores of the 40 messages and the dashed-line represents the lowest of the scores.

Thereafter, the Applicant has calculated the score of a message that is to be evaluated and the score of this message is represented by a cross, this forty-first message being different from the forty messages of the training database.

It can be seen from the figures that the difference between the score of the message that is to be evaluated and the smallest score obtained for the messages in the training database is greater for the geometric mean than for the arithmetic mean, and is greater still for the harmonic mean. This shows the sensitivities of these various scoring functions, and consequently shows that among these three functions, the harmonic mean is the function with the greatest chance of discriminating anomalies in the meaning of the invention.

In accordance with the invention, the method of creating a model Mj includes a step E40 of defining a threshold THj.

If a function is selected that discriminates values below the mean, the threshold may for example be defined as being the lowest score from among the scores SCRj of the messages MSGAj of the training database BAj. If a function is selected that discriminates values above the mean, the threshold may for example be defined as being the highest score from among the scores SCRj of the messages MSGAj of the training database BAj.

The creation method of the invention thus serves to create models Mj including a vector VPj, a scoring function SCRj, and a threshold THj.

Such a model Mj constitutes a software module for use in a method and in a device in accordance with the invention for detecting anomalies in order to detect whether a message that is to be evaluated and that is made up of symbols Ci constitutes an anomaly.

Figure 4:
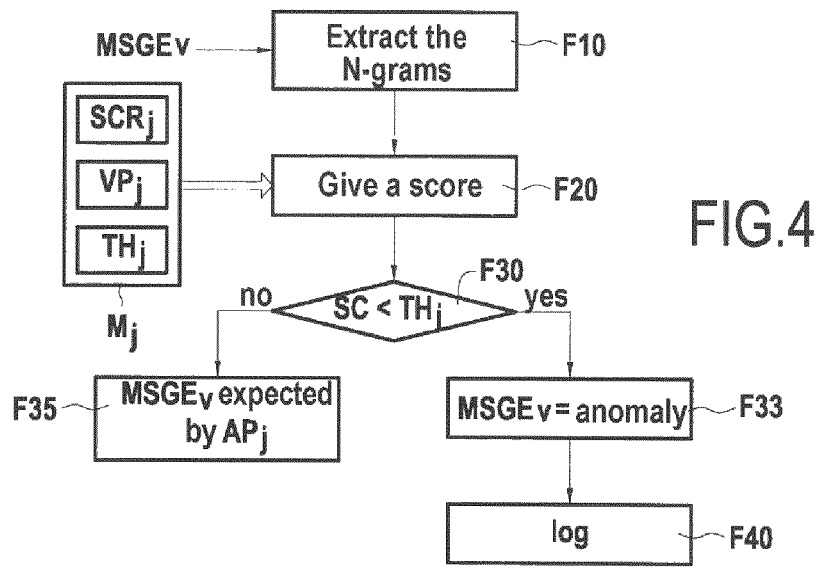
FIG. 4 is a flow chart showing the main steps of an anomaly detection of the invention in accordance with an implementation of the invention.

With reference to FIG. 4, there follows a description of a detection method in accordance with the invention.

This method includes a step F10 of extracting digrams from a message MSGEv that is to be evaluated, as described above with reference to FIG. 1.

The step F10 is followed by a step F20 of giving a score SC to the message MSGEv that is to be evaluated. For this purpose, the scoring function SCRj of the model Mj is used that gives this score on the basis of the vector VPj of the model Mj and on the basis of the digrams of the message MSGEv that is to be evaluated.

More precisely, for each of the digrams of the message that is to be evaluated, the following are extracted from the vector VPj;

the value pbq associated with the component VPCq if it is present in the first row of the vector, in other words if the digram is included in the training database BAj; or the default value vbdj associated with the component VPC0 if that digram is not included in the training database BAj. In this implementation, the score SC corresponds to the weighted harmonic mean constituted by the number of extracted digrams divided by the sum of the reciprocals of said extracted values.

For example, if the above-defined harmonic mean H is selected as the function SCRj, the score given to the message MSG of FIG. 1 is:

7/(7/2+7+7+7+7+7/2+7)

i.e. 1/6.

Giving consideration now to a message "bcc" that is to be evaluated and to the default value vbdj equal to 1/21, this harmonic mean H gives this message the score 2/(7+21), i.e. 1/14, since this message has two digrams, namely the digram "bc" of probability 1/7 and the digram "cc" having the default value 1/21.

The detection method of the invention determines whether the message MSGEv that is to be evaluated constitutes an anomaly by comparing, in a step F30, the score SC with the threshold THj of the model Mj. In the example of FIG. 4, it is considered that the message that is to be evaluated is an anomaly (step F33) if the score SC is strictly less than the threshold THj.

Otherwise, it is considered (step F35) that the message MSGEv that is to be evaluated is a message normally expected by the application APj.

In the presently-described implementation, an anomaly detected in step F30 is stored in a log in step F40.

First Variant for Calculating the Default Value vbdj

Figure 5:
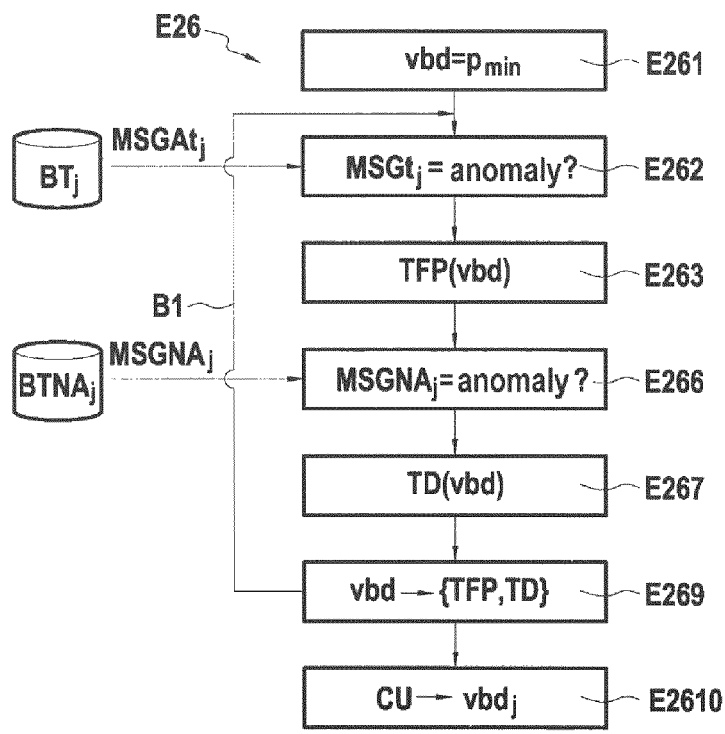
FIG. 5 is in the form of a flow chart showing the main steps of a first technique for determining a default value in accordance with an implementation of the invention.

With reference to FIG. 5, there follows a description of a first technique of using ROC curves known to the person skilled in the art and in accordance with the invention for the purpose of obtaining the default value to be given in the vector VPj to digrams that are not present in the training database BAj. This figure shows a first implementation of the step E26.

This implementation of the invention may be used if there is available not only a set of messages that are considered as being normally expected, but also a set of messages MSG-NAj that are considered as being not expected by said application APj and that may have been captured in the past (typically by performing the above-described step E11) and constituting all or part of a history of messages received by the application APj.

This method includes an initialization step E261 of initializing a current value vbd to a predetermined minimum value pmin, and a first loop B1 during which the current value vbd is varied, with a predetermined step size in this example, followed by a step E2610. The loop B1 comprises steps E262, E263, E266, E267, and E269.

During the step E262, the detection method described with reference to FIG. 4 is applied to the messages MSGAtj of the test database BTj in order to determine whether or not these messages constitute an anomaly. During this step, the function SCRj of the model Mj is used after setting the default value vbdj in said vector VPj to the current value vbd.

By their very nature, the messages MSGAtj of the test database are considered as being expected by the application APj. In other words, any messages detected as being anomalies during the step E262, constitute false positives.

Thus, during a step E263, a false positive rate TFP is determined for the messages MSGAtj of the test database BTj for the current value vbd. This rate is the ratio of the number of messages detected as being anomalies divided by the number of messages in the test database.

During a step E266, the detection method described above with reference to FIG. 4 is applied to the messages MSGNAj in order to determine whether these messages do or do not constitute anomalies. During this step, the function SCRj of the model Mj is used after setting the default value vbdj in said vector VPj to the current value vbd.

By their very nature, the messages MSGNAj are considered as being unexpected by the application APj and they can therefore be detected as anomalies. If an anomaly is detected during the step E266, it is considered to be a true positive.

During a step E267, the detection rate TD is determined for the current value vbd. This rate is the ratio of the number of messages detected as being anomalies divided by the number of messages in the test database of unexpected messages BTNAj.

Figure 6:
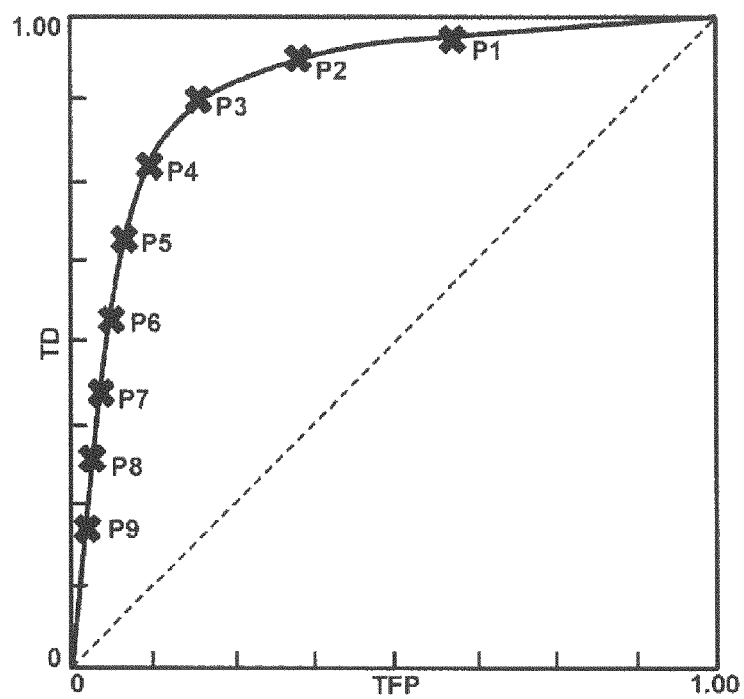
FIG. 6 is a plot of a receiver operating characteristic (ROC) type curve known to the person skilled in the art.

In this implementation, during a step E269, a pair is established that is associated with the current value of vbd, and that is represented in the reference frame shown in FIG. 6 by a point Pi having an abscissa value that corresponds to the false positive rate TFP calculated in step E263 and having an ordinate value that corresponds to the detection rate TD calculated in step E267.

This first method serves to use these points to trace a curve that is known to the person skilled in the art as an "ROC" curve.

Thereafter, the default value vbdj that is to be given in the vector VPj of the model Mj to digrams that are not present in the training database BAj is then selected on the basis of the rates TFP and TD as calculated during various iterations of the loop B1 and from a utilization context CU for the invention.

More precisely, in this implementation of the invention, it is possible (in step E2610) to select one of the pairs constituted during an occurrence of the step E269 of the invention and to read the value vbd associated with this pair in order to constitute the default value vbdj.

It is also possible to select a point of the curve in FIG. 6 and to calculate the value vbd associated with that point by interpolation.

In a manner that is known to the person skilled in the art, the utilization context CU (web, avionics communications) puts constraints on the tradeoff between the false positive rate TFP and the ability of the model to detect an anomaly, i.e. the detection rate TD.

The curve shown in FIG. 6 shows an evaluation of this tradeoff between the false positive rate TFP and the ability of the model Mj to detect an unexpected message as an anomaly.

Second Variant for Calculating the Default Value vbdj

Figure 7:
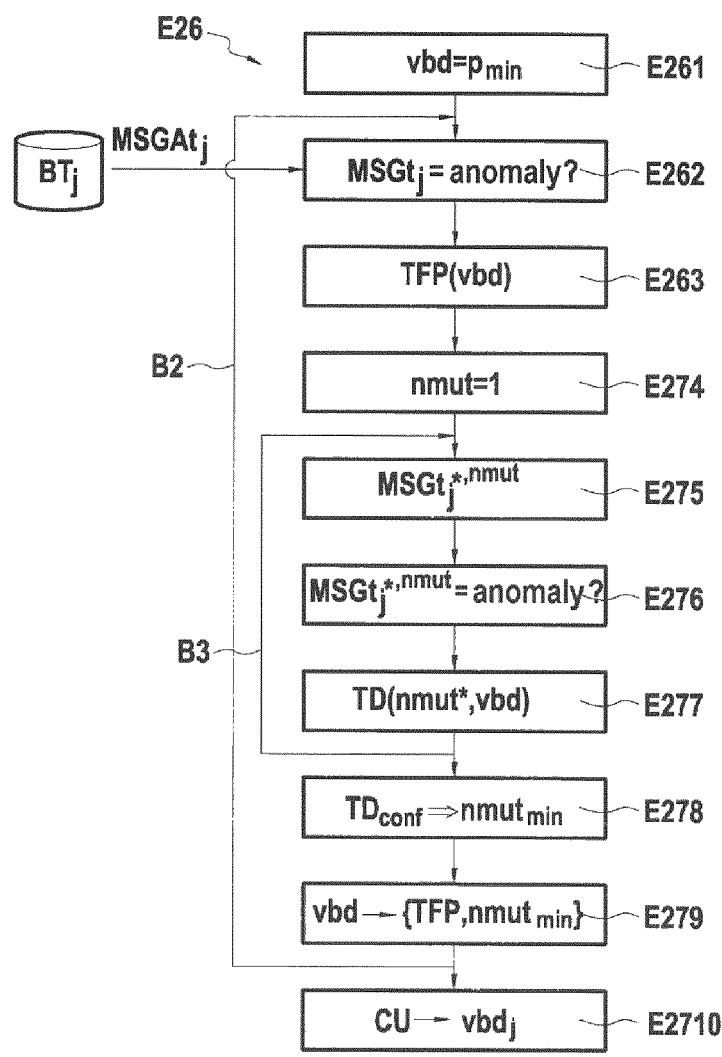
FIG. 7 is in the form of a flow chart showing the main steps of a second technique for determining the default value in accordance with an implementation of the invention.

With reference to FIG. 7, there follows a description of a second technique in accordance with the invention for obtaining the default value vbdj for associating in the vector VPj with digrams that are not present in the training database BAj. This figure thus shows an implementation of the step E26.

This variant can be used when a history of messages unexpected by the application APj is not available or when only an insufficient history of such messages is available. In this implementation, the step E11 described above with reference to FIG. 1 is not performed.

This method comprises steps E261, E262, and E263 identical to those described with reference to FIG. 5.

During the step E261, and as described above with reference to FIG. 5, a current value vbd is initialized at a predetermined minimum value pmin.

This method has a first loop B2 (similar to the loop B1 described with reference to FIG. 5) during which the current value vbd is caused to vary, using a predetermined step size in this example, and a step E2710. The loop B2 includes the steps E262 and E263 as described above, a step E274, a loop B3, followed by a step E278, and a step E279.

During the step E262, and as described with reference to FIG. 5, the detection method described with reference to FIG. 4 is applied to the messages MSGAtj of the test database BTj to determine whether or not those messages constitute anomalies. Any messages detected as anomalies during the step E262 constitute false positives, and during the step E263 a false positive rate TFP is determined for the messages MSGtj of the test database BTj for the current value vbd.

The loop B3 includes a step E275, a step E276, and a step E277.

During a step E274, a number of mutations nmut is initialized, with the loop B3 being designed to vary this number of mutations during each iteration. In the example of FIG. 7, the step E274 initializes nmut to 1 and the loop B3 increases this number of mutations by unity.

During a step E275, an unexpected message MSGtj*, nmut is generated for each of the messages of the test database by varying a number of mutations nmut for the symbols Ci in the digrams of the message MSGtj of the test database BTj. In other words, during this example, on the pth iteration of the loop B3, each unexpected message presents exactly p digrams in which one symbol has been mutated compared with a message of the test database.

During a step E276, the detection method described with reference to FIG. 4 is applied to the unexpected messages MSGtj *,nmut in order to determine whether or not those messages are detected as being anomalies. During this step, the function SCRj of the model Mj is used after setting the default value equal to the current value vbd in said vector VPj.

The messages MSGtj*,nmut are constructed so as to be detected as anomalies. If an anomaly is detected during the step E276, it constitutes a true positive.

Thus, during a step E277, a detection rate TD is determined for the messages that have been subjected to nmut mutations and for the current value vbd. This rate is the ratio of the number of messages detected as being anomalies divided by the number of messages in the test database that have been mutated. This step E277 terminates the loop B3.

Figures 1, 8:
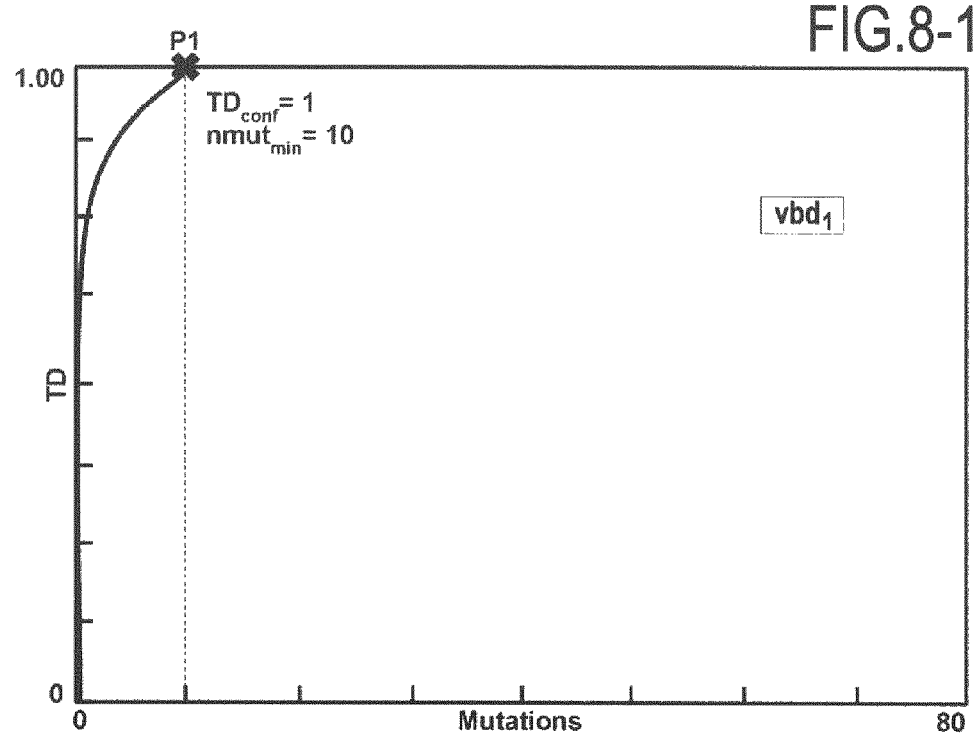
Figures 2, 8:
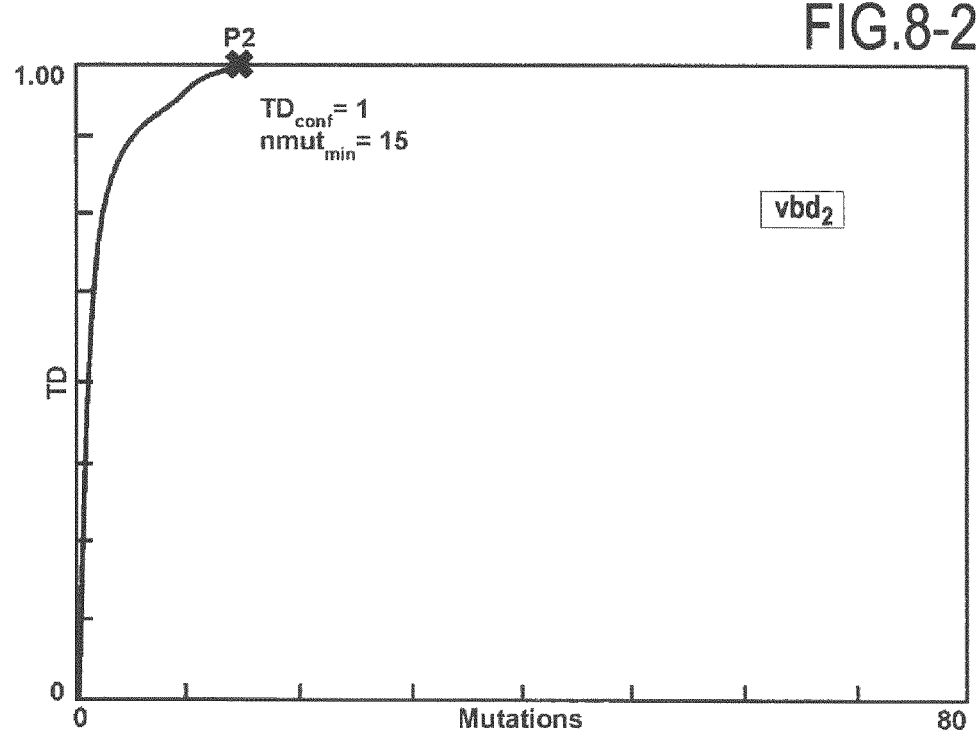
Figures 3, 8:
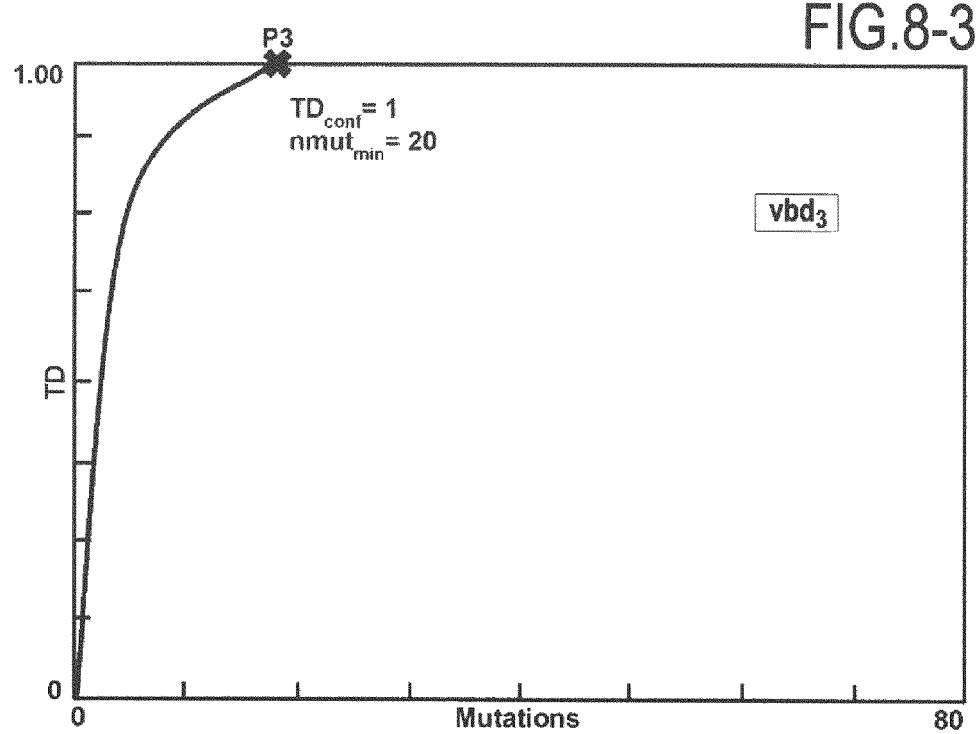
Figures 4, 8:
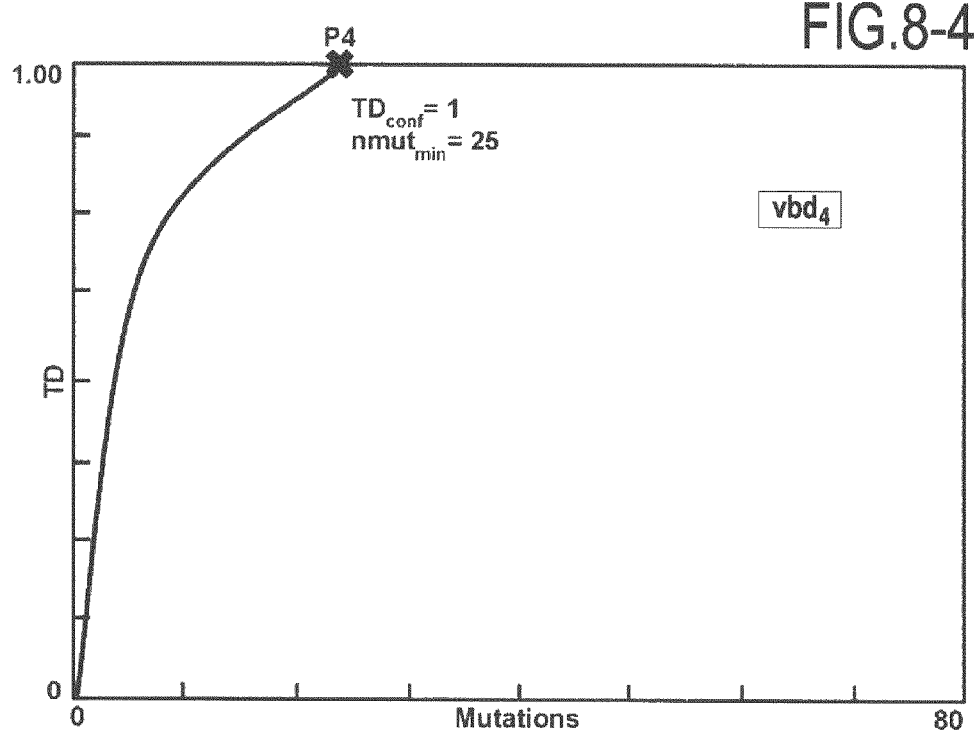
Figures 5, 8:
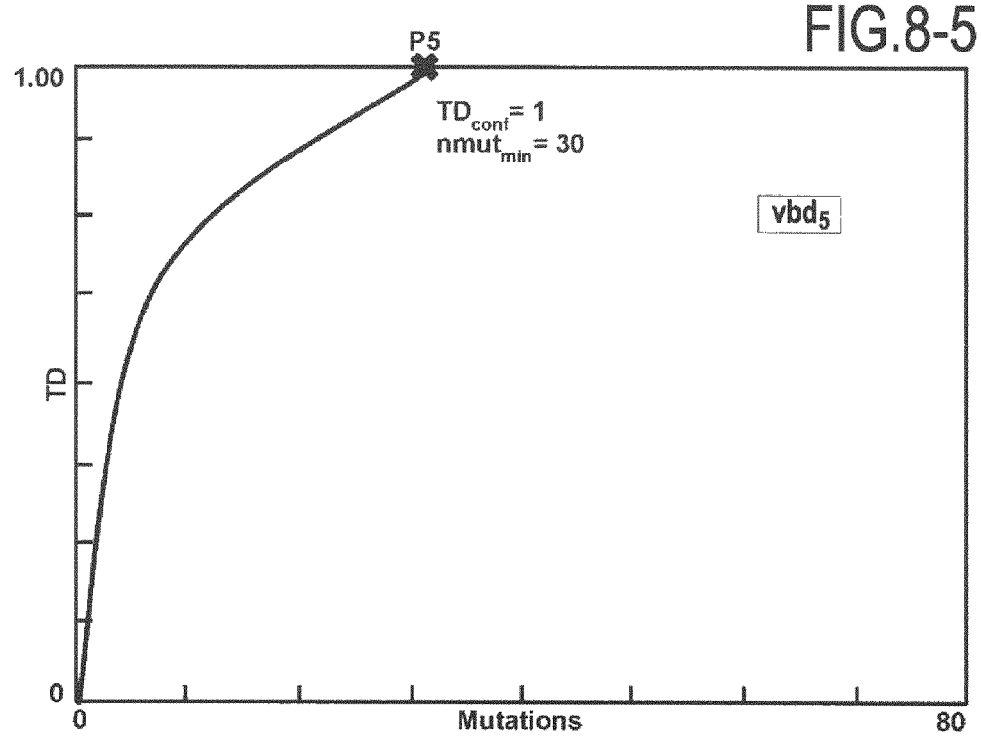
Figures 6, 8:
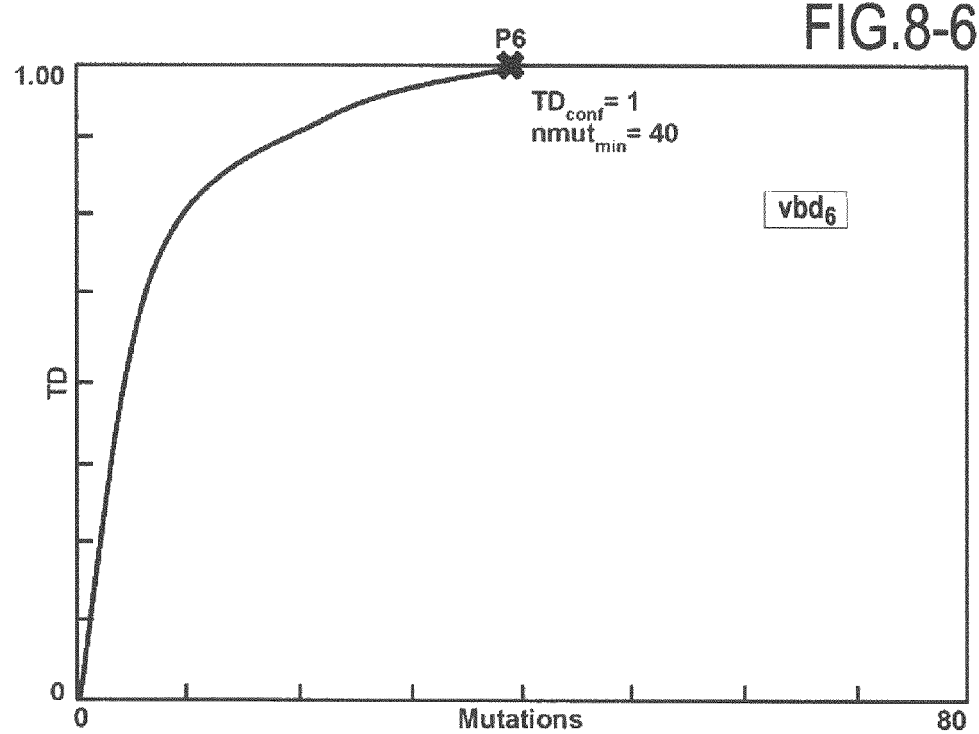
Figures 7, 8:
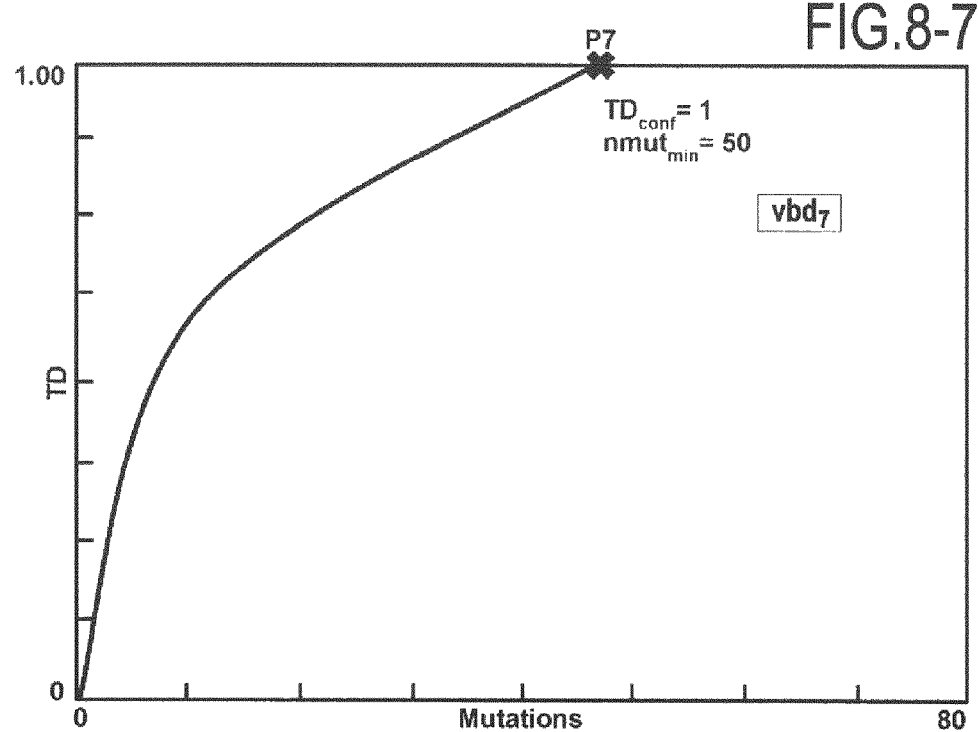
Figure 8:
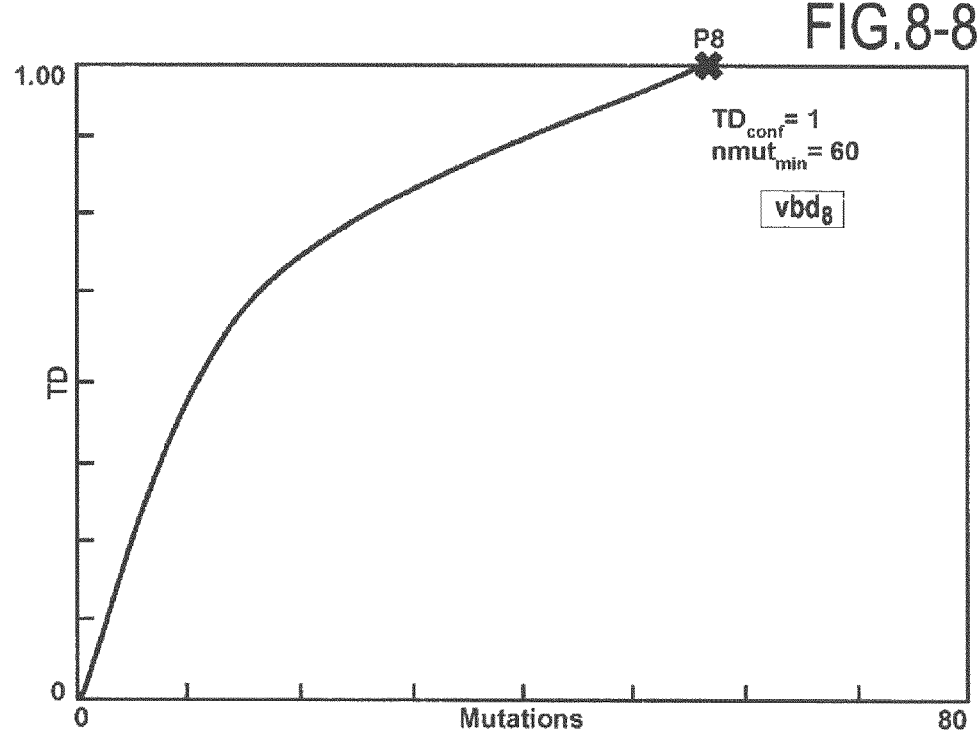
Figures 8, 9:
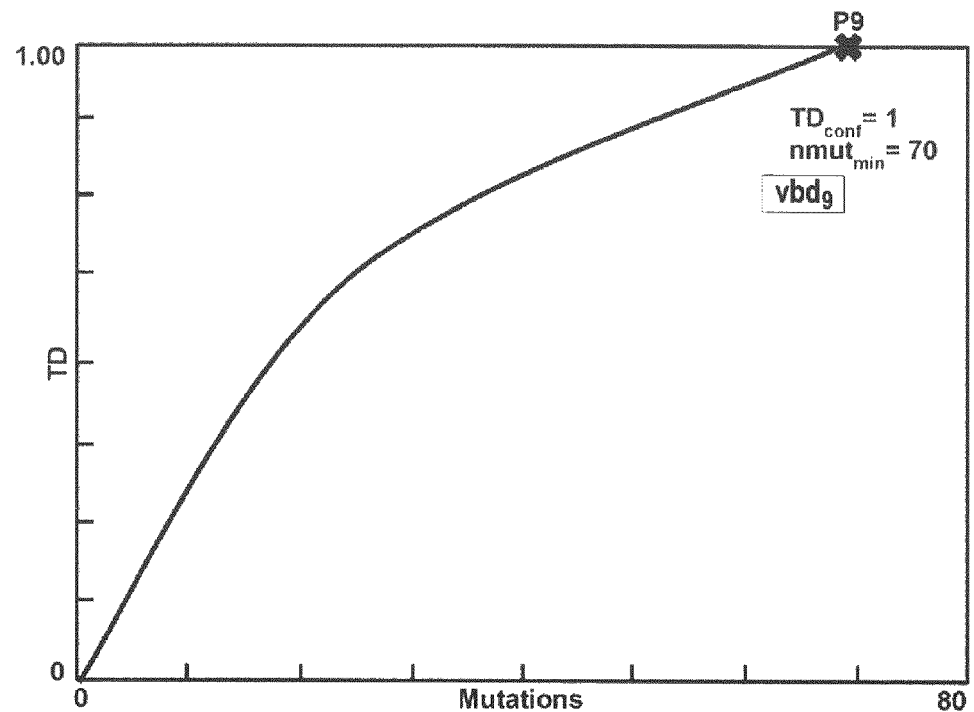
Figure 9:
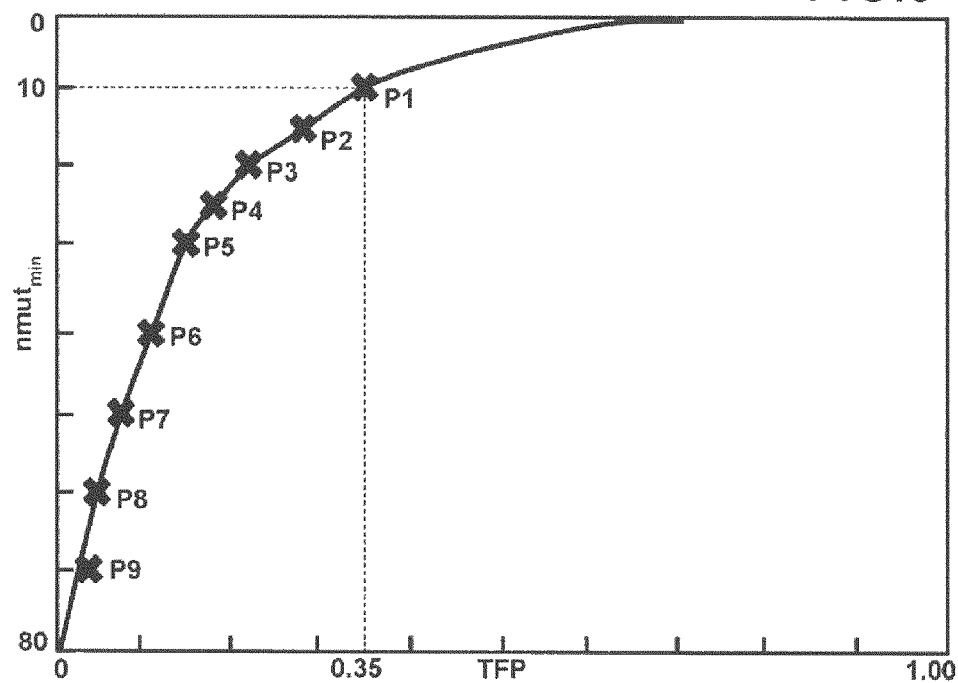

FIGS. 8-1 to 8-9 show variation in the detection rate TD as a function of the number nmut of mutations for nine values of the current value vbd, written vbd1 to vbd9.

During a step E278, a minimum number nmutmin of mutations is determined for obtaining a trusted detection rate (or a detection rate of confidence) TDconf that is predefined as a function of a utilization context CU for the invention as described in step E2710.

For example, if a predefined trusted rate TDconf is selected as 1, then from the nine curves of FIGS. 8-1 to 8-9, the following minimum numbers of mutations nmutmin are determined:

| Minimum number of mutations for a trusted rate $TD_{conf}$ of 1 | | | | | | | | |
|---|---|---|---|---|---|---|---|---|
| $vbd_1$ | $vbd_2$ | $vbd_3$ | $vbd_4$ | $vbd_5$ | $vbd_6$ | $vbd_7$ | $vbd_8$ | $vbd_9$ |
| $nmut_{min}$  10 | 15 | 20 | 25 | 30 | 40 | 50 | 60 | 70 |

During a step E279, the current value vbd is associated with a pair comprising said minimum number nmutmin of mutations as determined in step E278 and the false positive rate TFP calculated in step E263. This step terminates the loop B1.

Each pair serves to represent a point on the diagram of FIG. 9.

Variation in the false positive rate as a function of the
minimum number of mutations for a trusted rate $TD_{conf}$ of 1

|  | $vbd_1$ | $vbd_2$ | $vbd_3$ | $vbd_4$ | $vbd_5$ | $vbd_6$ | $vbd_7$ | $vbd_8$ | $vbd_9$ |
|---|---|---|---|---|---|---|---|---|---|
| $nmut_{min}$ | 10 | 15 | 20 | 25 | 30 | 40 | 50 | 60 | 70 |
| TFP | 0.35 | 0.28 | 0.22 | 0.18 | 0.15 | 0.11 | 0.08 | 0.05 | 0.03 |

In this implementation of the invention, a pair is selected during a step E2710 as constituted during an occurrence of the step E279 as a function of a utilization context CU for the invention, and the value vbd associated with this pair is given to the default value vbdj for use in the vector VPj of the model Mj for application to the digrams not present in the training database BAj.

The default value vbdj may also be determined by interpolation from a plurality of pairs. This operation amounts to determining a point on the curve of FIG. 9 that lies between two adjacent points Pi and Pi+1 of the curve, and in determining the value vbdj by interpolation between the values vbdi and vbdi+1 associated with these pairs.

The utilization context (web, avionics communications) puts constraints on the false positive rate TFP and on the ability of the model at detecting an anomaly (TD) as described above with reference to FIG. 5. In this second variant, this detection ability is represented by the minimum number of mutations. By construction, for an accepted false positive rate, the value vbdj associated with the pair guarantees that a message is detected as an anomaly within the limits of the trusted rate TDconf as set in step E278, providing the message includes at least nmutmin unknown digrams.

Messages containing fewer than nmutmin unknown digrams might also be detected, but the method does not guarantee that.

Figure 10:
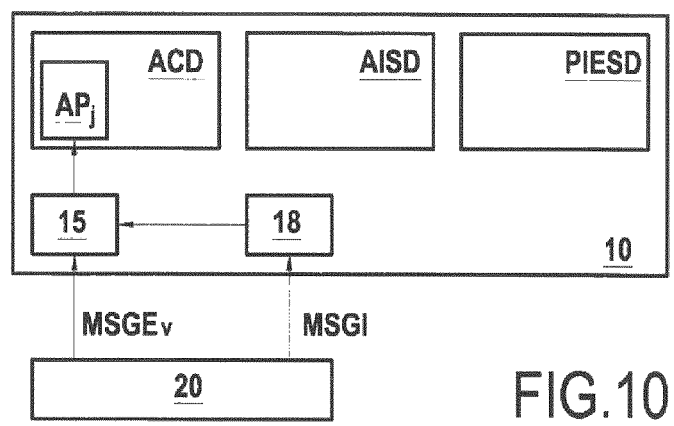
FIG. 10 shows a system in which the invention can be performed.

FIG. 10 shows a system in which the invention may be performed in the context of an aircraft.

It is recalled that in an aircraft 10, a certain number of applications APj communicate with equipment 20 on the ground.

In the field of avionics, it is common practice to take three main domains into consideration that are defined in particular in terms of criticality level, namely the aircraft control domain (ACD) which is very critical and which serves to control the airplane, the airline information system domain (AISD), and the passenger information and entertainment domain (PIESD) which is the least critical domain.

The invention may be used in particular to detect whether a message to an application APj on board the aircraft 10 does or does not constitute an anomaly.

In this implementation, these messages in the meaning of the invention may constitute a payload of messages of the ACARS type for the applications APj. It should be recalled that such a payload of messages MSGA of ACARS type received from the ground are switched to a destination application by a router 15 on board the aircraft as a function of a label contained in a header of the message.

These ACARS messages may possibly be encapsulated in IP packets MSGI and transmitted to the application APj via a gateway 18 of the AISD domain.

In practice, the model creation method may be performed in ground equipment. It serves to construct a model (vector, scoring function, threshold) for a given onboard application on the basis of a history of messages received by that application and classified as messages that are indeed expected by that application, and as messages that are not expected by that application.

The invention does not require knowledge about the nature of the anomalies, but when a history of anomalies is also present, the history can be used as described above with reference to FIG. 5 in order to determine the default value in the vector for giving to digrams that are not present in the training database.

Figure 11:
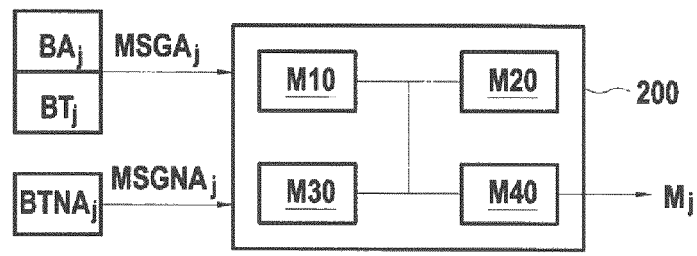
FIG. 11 shows a model creation device in accordance with an embodiment of the invention.

FIG. 11 shows a model creation device 200 in accordance with the invention.

The device comprises a module M10 suitable for obtaining a set of messages MSGAj contained in a training database BAj and in a test database BTj, and optionally a second set of messages MSGNAj contained in a database BTNAj, a module M20 for identifying all of the digrams in the messages, and suitable for generating a vector VPj as described above, a module M30 for defining a function SCRj suitable for giving a score SC to a message MSGEv that is to be evaluated and for defining a threshold THj, and a module M40 suitable for returning a model Mj comprising the vector VPj, the function SCRj, and the threshold THj in the form of a software module.

In practice, the device may be incorporated in a computer. The module M10 is a communication module suitable for receiving the messages MSGAj and MSGNAj via a network, or a reader module suitable for reading a medium including those messages, such as the databases BAj and BTNAj.

The module M20 may be a computer program executable by a processor and including instructions for extracting the various digrams and for calculating the various probabilities. The module M30 serves to define the scoring function and the threshold. The module M40 may be constituted by a tool serving to generate a computer object comprising one or more models Mj, e.g. in the form of a library.

The anomaly detection method may be performed either in the aircraft upstream from the application that is to be protected, e.g. in the router 15, in the gateway 18, or on the ground.

Figure 12:
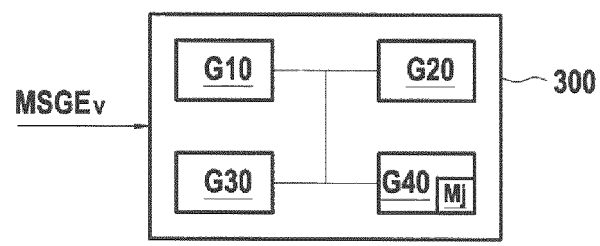
FIG. 12 shows an anomaly detection device in accordance with an embodiment of the invention.

FIG. 12 shows an anomaly detection device 300 in accordance with the invention and serving to determine whether a message MSGEv that is to be evaluated constitutes an anomaly. It comprises a module G10 for extracting the digrams from a message, a module G20 for giving a score SC to the message that is to be evaluated by using the model Mj, and a module G30 for comparing the score SC of the message MSGEv that is to evaluated with a threshold THj of the model in order to decide whether the message MSGEv that is to be evaluated is an anomaly.

The various modules G10, G20, and G30 may be software modules executable by a processor of the device. The device includes a memory G40 storing the model(s) Mj generated by the device 200.

What is claimed is:

1. A model creation method for creating a model serving to detect whether a message that is to be evaluated, that is constituted by symbols, and that might be received by an application, constitutes an anomaly, the method comprising:
   an obtaining step for obtaining a set of messages belonging to a reference class specific to the application in order to constitute a training database;
   an identification step for identifying the set of N-grams in the messages of the training database; and
   a generation step for generating a vector of the model, the vector associating:
      each of said N-grams with a value representing the probability of said N-gram occurring in the training database; and a default value for giving to the N-grams that do not belong to the messages of the training database;

said method further comprising:

a definition step for defining a function for giving a score to a message that is to be evaluated from the values of the vector associated with the N-grams of said message that is to be evaluated, this function being selected so as to discriminate between the scores of anomalies and the scores of normally expected messages by comparing those scores with a defined threshold that is defined for the function;

said message that is to be evaluated being considered as being an anomaly or not an anomaly as a function of the result of the comparison between said score given to the message and said threshold.

2. The method of claim 1, wherein, in order to give said score to said message that is to be evaluated, the function uses a generalized mean of order less than 1 applied to the components of the vector corresponding to the N-grams of the message that is to be evaluated.

3. The method of claim 1, wherein the N-grams are digrams.

4. The method of claim 1, wherein at least some of said messages of the reference class are ACARS messages or portions of ACARS messages.

5. The method of claim 4, wherein said ACARS messages are encapsulated in IP packets.

6. The method of claim 1, wherein said application complies with the ARINC standard.

7. An anomaly detection method serving to determine whether a message that is to be evaluated, that is constituted by symbols and that is to be received by an application, constitutes an anomaly, the method comprising:

an extraction step for extracting N-grams from the message that is to be evaluated;

a scoring step of giving the message that is to be evaluated a score determined from a vector and from the N-grams of the message that is to be evaluated, the vector associating each of the N-grams in a set of messages of a training database of a reference class with a value corresponding to a probability of that N-gram occurring in said training database, and a default value for N-grams that do not belong to the messages of the training database, said score being given by a function that is selected to discriminate between the scores of anomalies and the scores of messages normally expected by said application, by comparing the scores with a threshold defined for the function; and a comparison step of comparing the score of the message that is to be evaluated with said threshold in order to decide whether or not the message that is to be evaluated is an anomaly.

8. The method of claim 1, wherein said determination step for determining the default value for the N-grams that do not belong to the messages of the training database comprises:

a first loop during which a current value is caused to vary, this first loop comprising:

a detection step for detecting anomalies among the messages of a test database of the reference class, evaluating whether each of those messages constitutes an anomaly by using the anomaly detection method of claim 7 after setting the default value equal to said current value in said vector;

a determination step for determining a false positive rate for the messages of the test database for said current value on the basis of the number of anomalies detected among these messages;

a second loop during which a number of mutations is caused to vary, this second loop comprising:

a generation step for generating messages of the test database and for each of these messages to generate an unexpected message that is obtained by varying the number of mutations of symbols in the N-grams of this message; and a determination step for determining a detection rate for said unexpected messages;

a determination step for determining a minimum number of mutations for obtaining a predefined trusted detection rate; and a step during which each current value is associated with a pair comprising said minimum number of mutations and said false positive rate; and a selection step for selecting a said pair as a function of a utilization context for said method, said default value being selected on the basis of said value associated with said pair.

9. The method of claim 1, wherein the threshold is defined;

from the smallest score given to said messages of the training database, when said function discriminates anomaly scores by giving them low values; or from the highest score given to said messages of the training database, when said function discriminates anomaly scores by giving them high values.

10. The method of claim 1, wherein said determination step for determining the default value for the N-grams that do not belong to the messages of the training database comprises:

a loop during which a current value is caused to vary, the loop comprising:

a detection step for detecting anomalies among the messages of a test database of the reference class, evaluating whether each of those messages constitutes an anomaly by using the anomaly detection method of claim 7 after setting the default value equal to said current value in said vector;

a determination step for determining a false positive rate for the messages of the test database for said current value on the basis of the number of anomalies detected among the messages of the test database;

a detection step for detecting anomalies among messages unexpected by said application and contained in a database of messages not belonging to said reference class, evaluating whether each of these messages constitutes an anomaly by using the anomaly detection method according to claim 7 after setting said default value equal to said current value in said vector; and a determination step for determining a detection rate for each unexpected message on the basis of the number of anomalies detected among these unexpected messages;

said default value being selected from said rates and from a utilization context of said method.

11. The anomaly detection method of claim 10, characterized in that it includes a step of registering said anomaly or of generating a warning.

12. A model creation device for creating a model serving to detect whether a message that is to be evaluated, that is constituted by symbols, and that might be received by an application, constitutes an anomaly, the device comprising:

an obtaining module for obtaining a set of messages belonging to a reference class specific to the application in order to constitute a training database;

an identification module for identifying the set of N-grams in the messages of the training database; and a generation module for generating a vector of the model, the vector associating:

each of said N-grams with a value representing the probability of said N-gram occurring in the training database; and a default value for giving to the N-grams that do not belong to the messages of the training database;

said device further comprising:

a definition module for defining a function for giving a score to a message that is to be evaluated from the values of the vector associated with the N-grams of said message that is to be evaluated, this function being selected so as to discriminate between the scores of anomalies and the scores of normally expected messages by comparing those scores with a defined threshold that is defined for the function;

said message that is to be evaluated being considered as being an anomaly or not an anomaly as a function of the result of the comparison between said score given to the message and said threshold.

13. An anomaly detection device serving to determine whether a message that is to be evaluated, that is constituted by symbols and that is to be received by an application, constitutes an anomaly, the device comprising:

an extraction module for extracting N-grams from the message that is to be evaluated;

a scoring module of giving a score to the message that is to be evaluated from a vector and from the N-grams of the message that is to be evaluated, the vector associating each of the N-grams in a set of messages of a training database of a reference class with a value corresponding to a probability of that N-gram occurring in said training database, and a default value for N-grams that do not belong to the messages of the training database, said score being given by a function that is selected to discriminate between the scores of anomalies and the scores of messages normally expected by said application, by comparing the scores with a threshold defined for the function; and a comparison module of comparing the score of the message that is to be evaluated with said threshold in order to decide whether or not the message that is to be evaluated is an anomaly.

14. A computer program including instructions for executing steps of the model creation method according to claim 1 when said program is executed by a computer.

15. A computer program including instructions for executing steps of the anomaly detection method according to claim 9 when said program is executed by a computer.

16. A computer readable data medium storing a computer program containing instructions for executing steps of the model creation method according to claim 1.

17. A computer readable data medium storing a computer program including instructions for executing steps of the anomaly detection method according to claim 9.

* * * * *